(12) United States Patent
Li et al.

(10) Patent No.: US 11,081,069 B2
(45) Date of Patent: Aug. 3, 2021

(54) DATA RENDERING AND DRIVING OF ELECTRONIC DEVICE DISPLAYS

(71) Applicant: Apple Inc., Cupertino, CA (US)

(72) Inventors: Jun Li, San Jose, CA (US); Chaohao Wang, Sunnyvale, CA (US); Hopil Bae, Sunnyvale, CA (US); Mitchell H. Kline, Saratoga, CA (US); Xiaokai Li, Sunnyvale, CA (US)

(73) Assignee: Appe Inc., Cupertino, CA (US)

( * ) Notice: Subject to any disclaimer, the term of this patent is extended or adjusted under 35 U.S.C. 154(b) by 0 days.

(21) Appl. No.: 16/509,406

(22) Filed: Jul. 11, 2019

(65) Prior Publication Data

US 2020/0098324 A1 Mar. 26, 2020

Related U.S. Application Data

(60) Provisional application No. 62/734,956, filed on Sep. 21, 2018.

(51) Int. Cl.
*G06F 1/00* (2006.01)
*G09G 3/36* (2006.01)
*G09G 3/34* (2006.01)
*G09G 5/14* (2006.01)

(52) U.S. Cl.
CPC ......... *G09G 3/3611* (2013.01); *G09G 3/3406* (2013.01); *G09G 5/14* (2013.01); *G09G 2320/0252* (2013.01); *G09G 2320/0686* (2013.01)

(58) Field of Classification Search
None
See application file for complete search history.

(56) References Cited

U.S. PATENT DOCUMENTS

2016/0171926 A1* 6/2016 Niu ............... H04N 13/359
345/204
2017/0195658 A1* 7/2017 Jung ............. G09G 3/3258

* cited by examiner

*Primary Examiner* — Michael A Faragalla
(74) *Attorney, Agent, or Firm* — Aikin & Gallant, LLP

(57) ABSTRACT

Aspects of the subject technology relate to displays for electronic devices and methods of operating the displays. The display may include an array of display pixels arranged in rows and columns. A v-drive operation in which rows are alternatingly operated about a center of each of two halves of the display is provided. Data rendering operations are provided that generate a virtual frame rate boost.

24 Claims, 15 Drawing Sheets

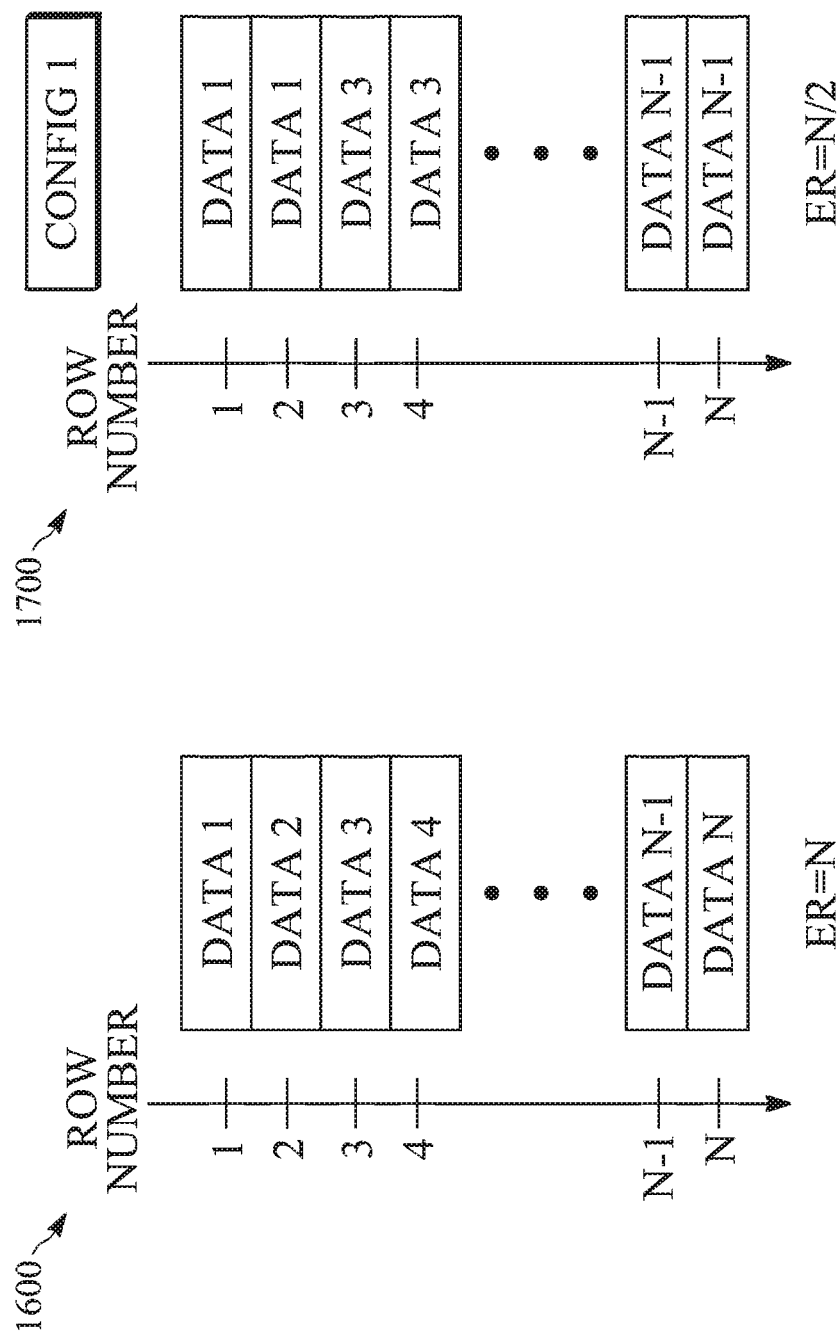

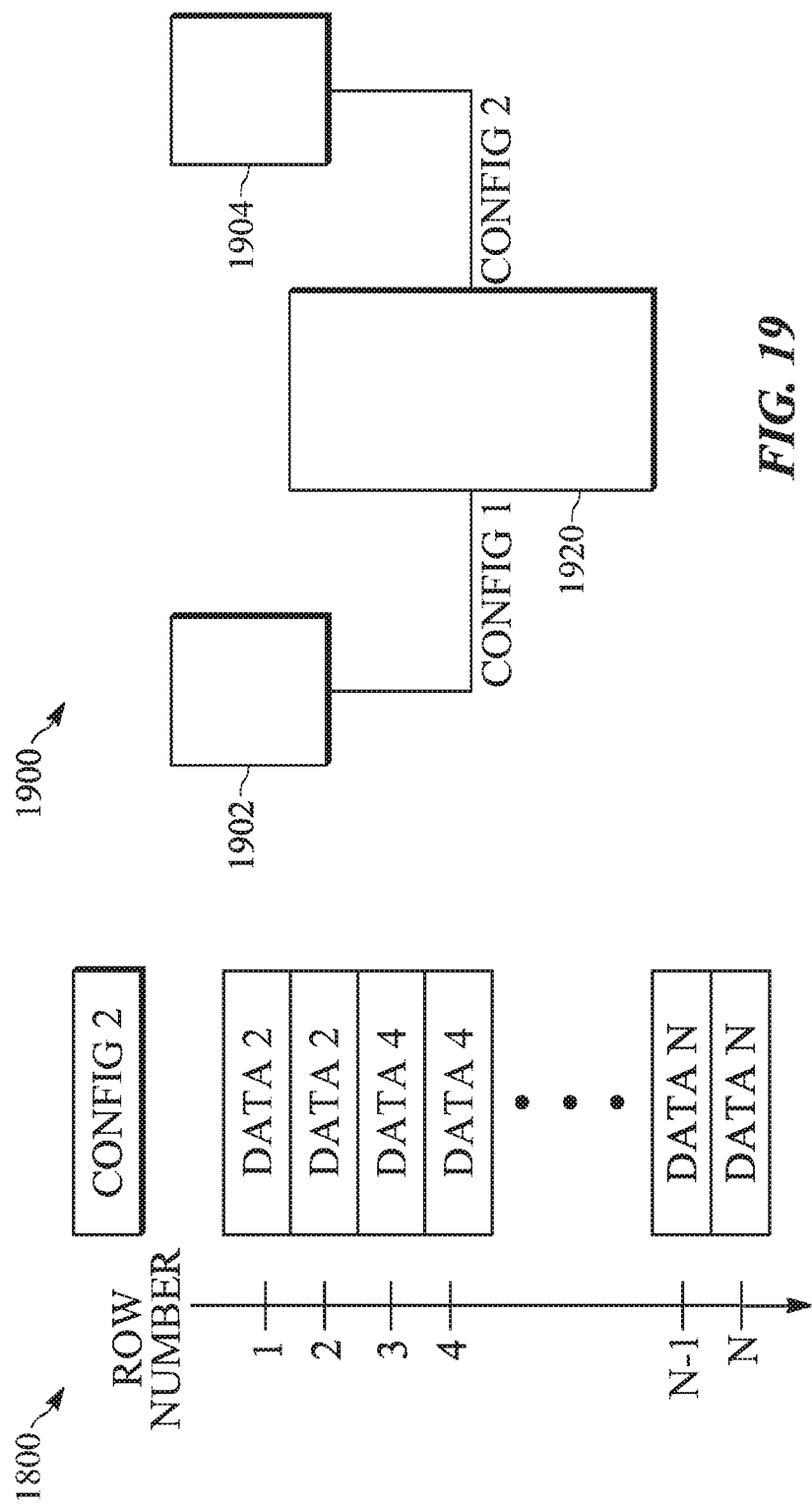

DATA RENDERING AND DRIVING OF ELECTRONIC DEVICE DISPLAYS

CROSS-REFERENCE

This application claims benefit of U.S. Provisional Patent Application No. 62/734,956 filed Sep. 21, 2018, which is hereby incorporated herein by reference.

TECHNICAL FIELD

The present description relates generally to electronic device displays, and more particularly, but not exclusively, to data rendering and driving of electronic device displays.

BACKGROUND

Electronic devices such as computers, media players, cellular telephones, set-top boxes, and other electronic equipment are often provided with displays for displaying visual information. Displays such as organic light-emitting diode (OLED) displays and liquid crystal displays (LCDs) are commonly provided in portable electronic devices and typically include an array of display pixels arranged in pixel rows and pixel columns. These displays are typically used to display a single image, multiple images, or a stream of images, such as a video stream, to be viewed by both eyes of the viewer.

Image and video content is also sometimes generated for separate viewing by the user's left and right eyes. For example, a movie theater can provide polarized or colored glasses or goggles to patrons that visually separate two concurrent (and commonly overlapping) images that, due to the separation of the viewer's eyes, add three-dimensional depth to the displayed concurrent images. This depth can be used to provide virtual reality (VR) content in which a three-dimensional computer-generated immersive environment is created for the user and/or to provide augmented reality (AR) content in which computer-generated content is added to a direct or camera-generated view of the real-world environment surrounding the user.

AR and VR content can also be provided with dedicated AR/VR devices that often include two separate displays, one for each eye of the users, and that mask out all other visual input to the user's eyes.

However, it can be difficult to provide this type of content on a multi-function device such as a smartphone or a tablet, without generating visible artifacts such as motion blur, luminance offsets, or other effects which can be unpleasant or even dizzying to a viewer.

SUMMARY OF THE DESCRIPTION

In accordance with various aspects of the subject disclosure, an electronic device with a display is provided. The display comprises an array of display pixels including a first half on a first side of a center of the array, and a second half on a second side of the center of the array. Display control circuitry is configured to alternatingly operate pixels rows on first and second sides of a center of the first half of the array of display pixels to display a first portion of a display frame and alternatingly operate pixels rows on first and second sides of a center of the second half of the array of display pixels to display a second portion of the display frame.

In accordance with other aspects of the subject disclosure, a method of operating a display for an electronic device is provided, the display including an array of display pixels, the array including a first half on a first side of a center of the array, and a second half on a second side of the center of the array. The method includes alternatingly operating pixels rows on first and second sides of a center of the first half of the array of display pixels to display a first portion of a display frame, and alternatingly operating pixels rows on first and second sides of a center of the second half of the array of display pixels to display a second portion of the display frame.

In accordance with other aspects of the subject disclosure, an electronic device having a display is provided, the display including an array of display pixels having a first portion and a second portion, and display control circuitry. The display control circuitry is configured to render first display content for a first partial display frame to be displayed using the first portion of the array, display the first partial display frame using the first portion of the array, render second display content for a second partial display frame to be displayed using the second portion of the array, display the second partial display frame using the second portion of the array.

In accordance with other aspects of the subject disclosure, an electronic device having a display is provided, the display including an array of display pixels and display control circuitry having multiple processing resources is configured to render, with a first processing resource, a first configuration having a first subset of data for a first frame to be displayed using the array of display pixels. The display control circuitry is configured to render, with a second processing resource, a second configuration having a second subset of data for the first frame to be displayed using the array of display pixels, to display the first subset of data during a first time period for the first frame using the array of display pixels, and to display the second subset of data during a second time period for the first frame using the array of display pixels.

BRIEF DESCRIPTION OF THE DRAWINGS

Certain features of the subject technology are set forth in the appended claims. However, for purpose of explanation, several embodiments of the subject technology are set forth in the following figures.

FIG. 16 illustrates a display having pixel row numbers and associated data for a frame rate booster in accordance with another embodiment.

FIG. 17 illustrates a display having a first configuration with pixel row numbers and associated first subset of data (e.g., odd data) for a frame rate booster in accordance with another embodiment.

FIG. 18 illustrates a display having a second configuration with pixel row numbers and associated second subset of data (e.g., even data) for a frame rate booster in accordance with another embodiment.

FIG. 19 illustrates multiple processing resources coupled to a display 1920 for a frame rate booster in accordance with another embodiment.

DETAILED DESCRIPTION

Figure 1:
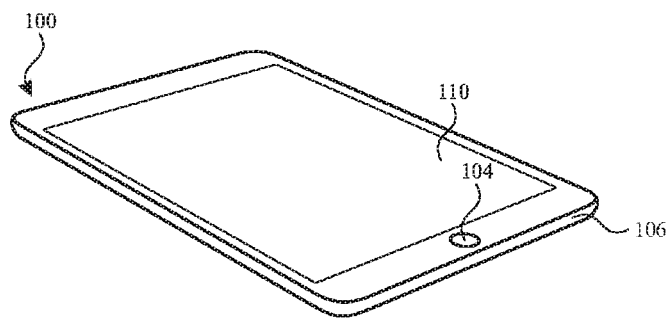
FIG. 1 illustrates a perspective view of an example electronic device having a display in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides control circuitry for electronic device displays such as organic light-emitting diode (OLED) displays, liquid crystal displays (LCDs), plasma displays, or displays based on other display technologies. In accordance with various aspects, the electronic device displays are gate-in-panel (GIP) displays in which control circuitry for operating the pixels of the display is disposed on the same substrate (panel) on which the pixels are formed (e.g., using thin-film transistor components on the substrate).

Displays as described herein may be included in electronic devices such as cellular telephones, media players, computers, set-top boxes, wireless access points, and other electronic equipment that may include displays. Displays are used to present visual information and status data and/or may be used to gather user input data. A display includes an array of display pixels. The array of display pixels is disposed in an active area of the display. The array of display pixels is arranged in pixel rows and pixel columns. Each display pixel may include one or more colored subpixels for displaying color images.

In some display modes, the entire display is operated to display an image (or string of image frames such as video frames) that are each intended to be viewed by both eyes of a viewer of the display. However, in some operating modes, the display is operated for split viewing of the display, in which a first portion (e.g., half) of the display is used to display content for the left eye of the viewer and a second portion (e.g., another half) of the display is used to display content for the right eye of the viewer.

For example, three-dimensional (3D) movie content, Augmented Reality (AR) applications that overlay virtual objects on a direct or camera view of the real-world environment, and Virtual Reality (VR) applications that generate three-dimensional virtual environments that are explorable by the user may utilize a split-screen view in which a first portion (e.g., half) of the display is used to display content for the left eye of the viewer and a second portion (e.g., another half) of the display is used to display content for the right eye of the viewer.

However, for some LCD and OLED displays (e.g., in a smartphone or tablet), visible artifacts can arise, particularly in a split-screen mode of operation. For example, motion blur can occur for fast-moving display objects. Moreover, common smartphone or tablet displays operate rows of pixels in a sequential manner from the top to the bottom of a pixel array, which can cause a visible systematic luminance offset for the left and right portions of the display in a split-screen mode of operation (e.g., due to a liquid crystal response delay in LCD displays). This can be particularly problematic if backlight strobing or pulsing is implemented to reduce motion blur.

In accordance with various aspects of the subject technology, data rendering and row driving systems and methods are provided which can compensate and/or prevent the above-noted artifacts, particularly for split-screen applications.

An illustrative electronic device having a display is shown in FIG. 1. In the example of FIG. 1, device 100 has been implemented using a housing that is sufficiently small to be portable and carried by a user (e.g., device 100 of FIG. 1 may be a handheld electronic device such as a tablet computer or a cellular telephone). As shown in FIG. 1, device 100 includes a display such as display 110 mounted on the front of housing 106. Display 110 may be a gate-in-panel (GIP) display that includes active display pixels in an active area of the display and control circuitry for operating the active display pixels an inactive portion. Display 110 may have openings (e.g., openings in the inactive or active portions of display 110) such as an opening to accommodate button 104 and/or other openings such as an opening to accommodate a speaker, a light source, or a camera.

Display 110 may be a touch screen that incorporates capacitive touch electrodes or other touch sensor components or may be a display that is not touch-sensitive. Display 110 includes display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Arrangements in which display 110 is formed using an LCD unit having an array of display pixels that are backlit (e.g., in zones) by a backlight unit are sometimes described herein as an example. This is, however, merely illustrative. In various implementations, any suitable type of display pixel technology may be used in forming display 110 if desired.

Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a somewhat smaller portable device such as a wrist-watch device, a pendant device, or other wearable or miniature device, a media player, a gaming device, a navigation device, a computer monitor, a television, or other electronic equipment.

For example, in some implementations, housing 106 may be formed using a unibody configuration in which some or all of housing 106 is machined or molded as a single structure or may be formed using multiple structures (e.g., an internal frame structure, one or more structures that form exterior housing surfaces, etc.). Although housing 106 of FIG. 1 is shown as a single structure, housing 106 may have multiple parts. For example, housing 106 may have upper portion and lower portion coupled to the upper portion using a hinge that allows the upper portion to rotate about a rotational axis relative to the lower portion. A keyboard such as a QWERTY keyboard and a touch pad may be mounted in the lower housing portion, in some implementations.

In some implementations, electronic device 100 is provided in the form of a computer integrated into a computer monitor. Display 110 may be mounted on a front surface of housing 106 and a stand may be provided to support housing 106 (e.g., on a desktop).

Figure 2:
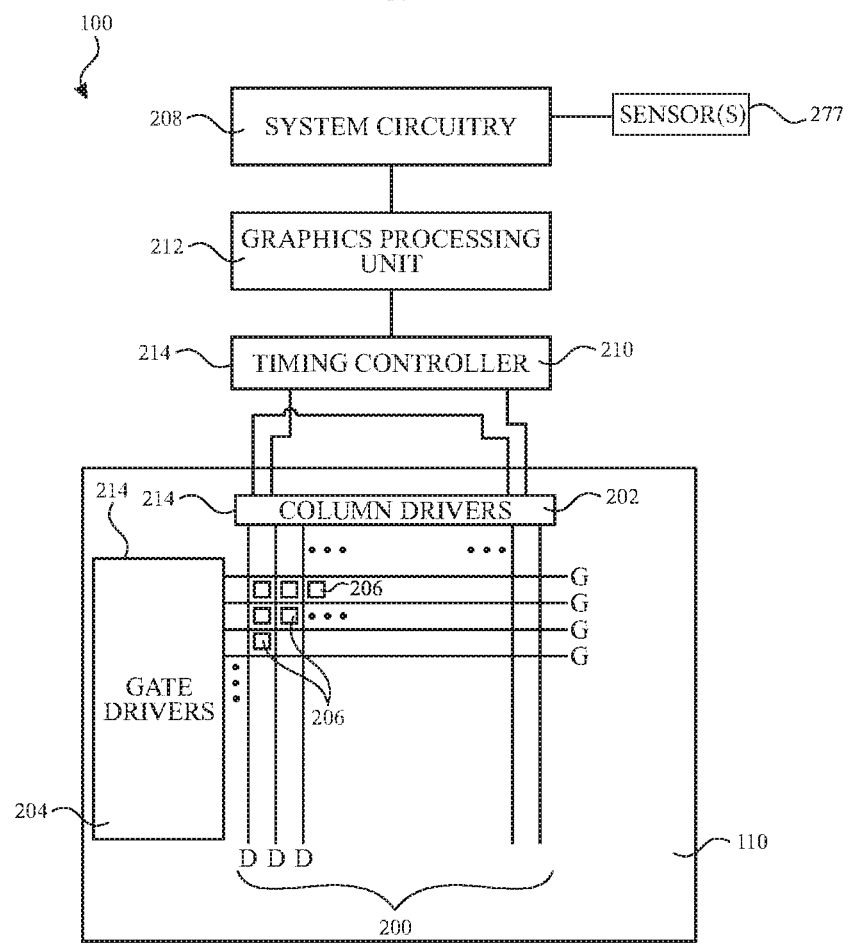
FIG. 2 illustrates a schematic diagram of exemplary display circuitry in accordance with various aspects of the subject technology.

FIG. 2 is a schematic diagram of device 100 showing illustrative circuitry that may be used in displaying images for a user of device 100 on pixel array 200 of display 110. As shown in FIG. 2, display 110 may include column driver circuitry 202 that drives data signals (analog voltages) onto the data lines D of array 200. Gate driver circuitry 204 may drive gate line signals onto gate lines G of array 200.

Using the data lines D and gate lines G, display pixels 206 may be operated to display images on display 110 for a user. In some implementations, gate driver circuitry 204 may be implemented using thin-film transistor circuitry on a display substrate such as a glass or plastic display substrate or may be implemented using integrated circuits that are mounted on the display substrate or attached to the display substrate by a flexible printed circuit or other connecting layer. For example, gate driver circuitry 204 may include one or more of gate-in-panel (GIP) driver circuits directly formed on the display panel substrate (e.g., each configured to provide a gate signal along a corresponding one of signal gate lines G for a corresponding row of display pixels 206). In some implementations, column driver circuitry 202 may be implemented using one or more column driver integrated circuits that are mounted on the display substrate or using column driver circuits mounted on other substrates.

Device 100 may include system circuitry 208. System circuitry 208 may include one or more different types of storage such as hard disk drive storage, nonvolatile memory (e.g., flash memory or other electrically-programmable-read-only memory), volatile memory (e.g., static or dynamic random-access-memory), magnetic or optical storage, permanent or removable storage and/or other non-transitory storage media configure to store static data, dynamic data, and/or computer readable instructions for processing circuitry in system circuitry 208. Processing circuitry in system circuitry 208 may be used in controlling the operation of device 100. Processing circuitry in system circuitry 208 may sometimes be referred to herein as system circuitry or a system-on-chip (SOC) for device 100.

The processing circuitry may be based on a processor such as a microprocessor and other suitable integrated circuits, multi-core processors, one or more application specific integrated circuits (ASICs) or field programmable gate arrays (FPGAs) that execute sequences of instructions or code, as examples. In one suitable arrangement, system circuitry 208 may be used to run software for device 100, such as internet browsing applications, email applications, media playback applications, operating system functions, software for capturing and processing images, augmented reality (AR) applications, virtual reality (VR) applications, three-dimensional (3D) video applications, etc.

During operation of device 100, system circuitry 208 may generate or receive display content that is to be displayed on display 110. This display content may be processed, scaled, modified, and/or provided to display control circuitry such as graphics processing unit (GPU) 212. For example, system circuitry 208 may receive or generate AR or VR content to be displayed by display 110. System circuitry 208 may also receive sensor data from one or more sensors 277 of device 100 and/or one or more external sensors. For example, system circuitry 208 may receive head position and/or head motion data, eye position and/or eye motion data, and/or other sensor data from one or more accelerometers, gyroscopes, compasses, and/or cameras of device 100 and/or communicatively coupled to device 100 from remote locations.

For AR and/or VR applications, system circuitry 208 may generate the display content based, at least in part, on the sensor data. For example, system circuitry 208 may generate display content depending on which direction the user is looking, which direction the user's view/head position is moving, and/or the real-world objects in the user's view (e.g., for AR applications) and/or moving into the user's view.

System circuitry 208 and/or GPU 212 may process the sensor data and/or display content to render display frames to be provided to timing controller integrated circuit 210. In some scenarios, system circuitry 208 and/or GPU 212 render full display frames for display with the entire active area of pixel array 200 (e.g., display frames that include pixel values for all active pixels in the display). In some scenarios, system circuitry 208 and/or GPU 212 render partial display frames for display with only a portion of the active area of pixel array 200 (e.g., partial display frames with pixel values only for a portion of the display such as half of the display).

Timing controller 210 provides digital display data (e.g., the digital pixel values of the full or partial display frames, each pixel value corresponding to a grey level for display) to column driver circuitry 202. Column driver circuitry 202 may receive the digital display data from timing controller 210. Using digital-to-analog converter circuitry within column driver circuitry 202, column driver circuitry 202 may provide corresponding analog output signals on the data lines D running along the columns of display pixels 206 of array 200.

Graphics processing unit 212 and timing controller 210 may sometimes collectively be referred to herein as display control circuitry 214. Display control circuitry 214 may be used in controlling the operation of display 110. Display control circuitry 214 may sometimes be referred to herein as a display driver, a display controller, a display driver integrated circuit (IC), or a driver IC. Graphics processing unit 212 and timing controller 210 may be formed in a common package (e.g., an SOC package) or may be implemented separately (e.g., as separate integrated circuits). In some implementations, timing controller 210 may be implemented separately as a display driver, a display controller, a display driver integrated circuit (IC), or a driver IC that receives processed display data from graphics processing unit 212. Accordingly, in some implementations, graphics processing unit 212 may be considered to be part of the system circuitry (e.g., together with system circuitry 208) that provides display data to the display control circuitry (e.g., implemented as timing controller 210, gate drivers 204, and/or column drivers 202). Although a signal gate line G and a single data line D for each pixel 206 are illustrated in FIG. 2, this is merely illustrative and one or more additional row-wise and/or column-wise control lines may be coupled to each pixel 206 in various implementations.

Figure 4:
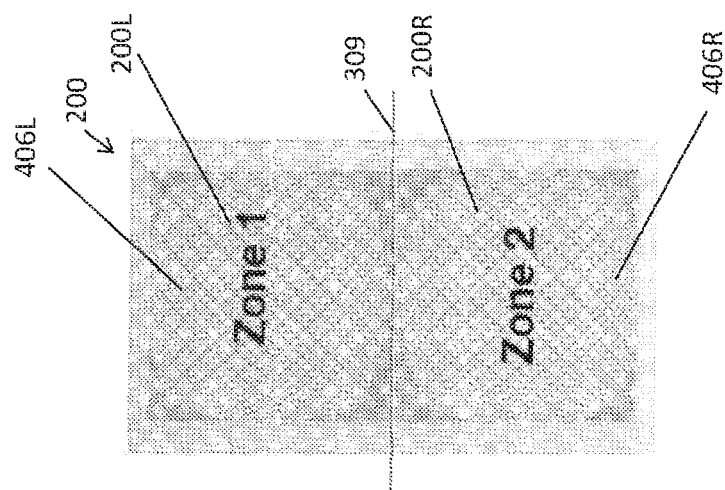
FIG. 4 illustrates a schematic diagram of a pixel array in a split-screen mode of operation in accordance with various aspects of the subject technology.
Figure 3:
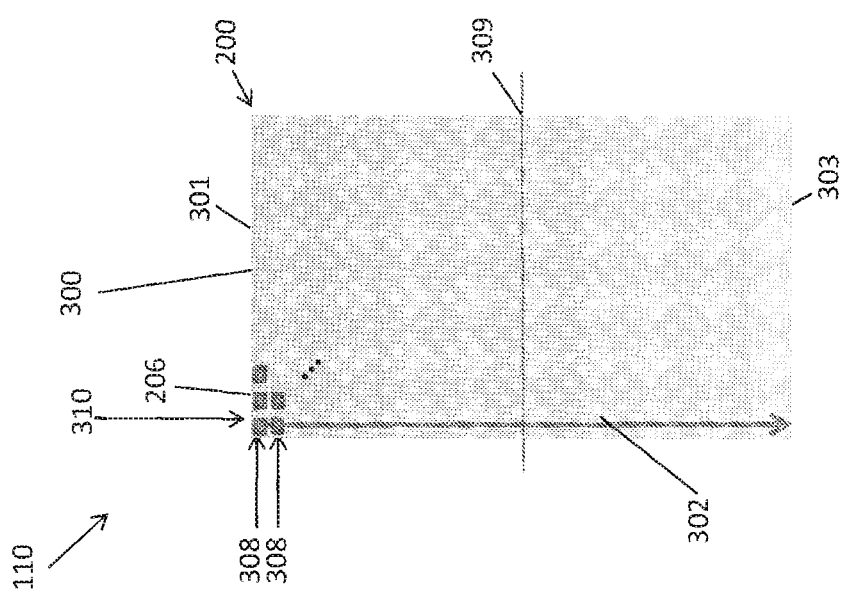
FIG. 3 illustrates a schematic diagram of a pixel array in operation in accordance with various aspects of the subject technology.

FIGS. 3 and 4 illustrate operations of pixel array 200 of display 110. As shown in FIG. 3, display pixels 206 are arranged in pixel rows 308 and pixel columns 310. In the example of FIG. 3, display content 300 may be displayed using pixels 206 by driving pixel rows 308 sequentially (as indicated by arrow 302) across the entire array from a topmost pixel row 308 located at a top end 301 of pixel array 200, across a center 309 of pixel array 200, to a bottommost row located at a bottom end 303 of pixel array 200. Display content 300 may be full-screen content in which the entire display is intended to be viewed by both eyes of a user or may be split-screen content in which half of the content is intended for viewing by the user's left eye and half of the content is intended for viewing by the user's right eye.

FIG. 4 illustrates an example in which split-screen content including left-eye content 406L for a user's left eye 451 and right-eye content 406R for the user's right eye 453, is displayed. Left-eye content 406L is displayed using pixels rows 308 of a left portion 200L (e.g., a left half on a left side of center 309) of display 110 and right-eye content 406R is displayed using pixel rows 308 of a right portion 200R (e.g., a right half on a right side of center 309) of display 110. As indicated, left portion 200L of array 200 may also correspond to a first zone (e.g., Zone 1) of the display backlight. Right portion 200R of array 200 may also correspond to a second zone (e.g., Zone 2) of the display backlight.

Left-eye content 406L and right-eye content 406R may be provided to array 200 in a common display frame that is displayed using the sequential row operation indicated in FIG. 3 or the v-drive row operation described herein after in connection with FIGS. 10-15, or may be provided in partial display frames as described in further detail hereinafter in connection with FIGS. 7-9. By providing display content to array 200 by rendering partial display frames, the effective frame rate at which display 110 is operated can be increased (e.g., doubled or more than doubled) without the significant power usage increase associated with an increased frame rate using full display frames.

Figure 5:
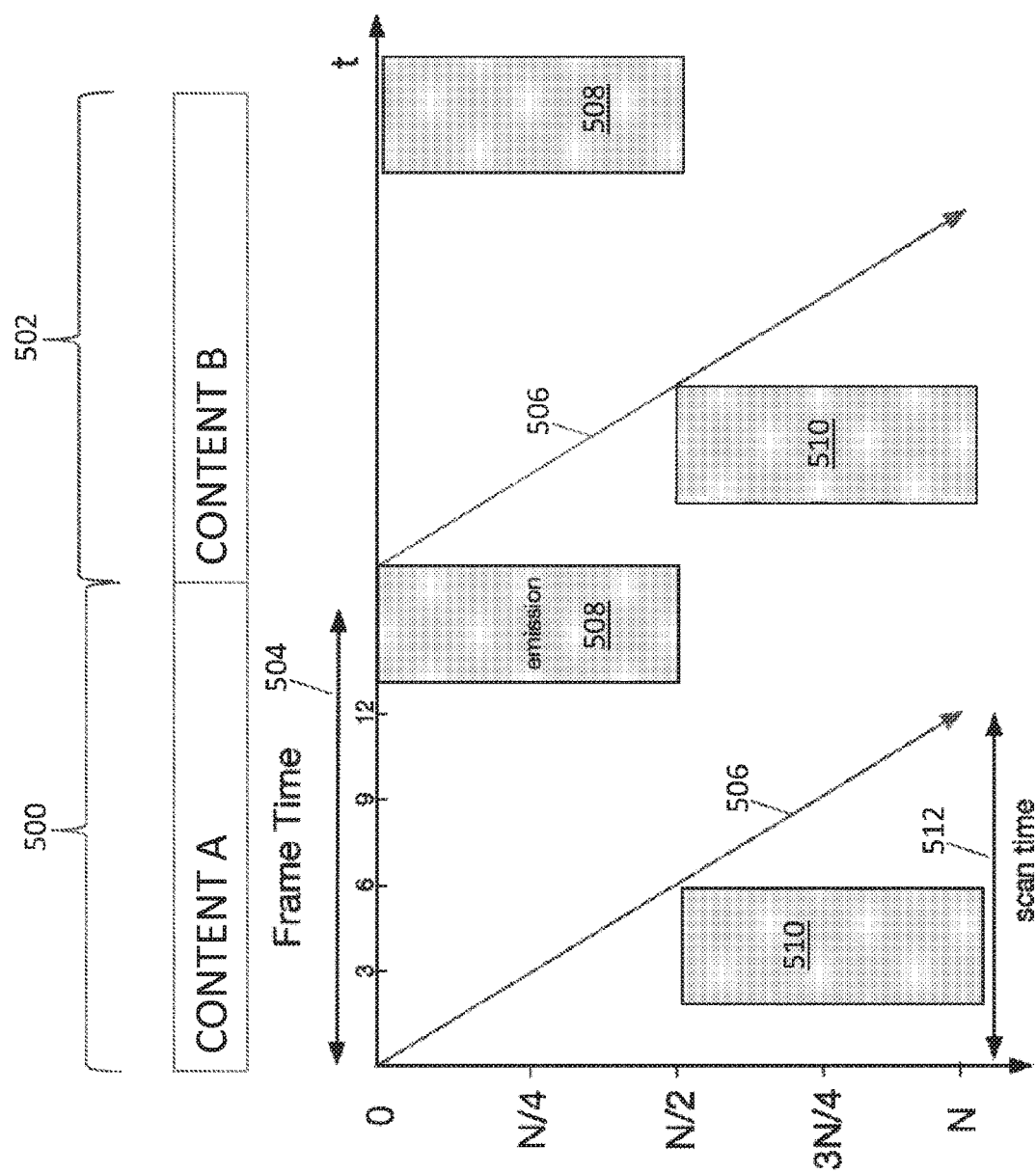
FIG. 5 illustrates a schematic diagram of timing aspects operation of a display in accordance with various aspects of the subject technology.

For full-screen display content, display 110 may be operated as illustrated in FIG. 5. As shown in FIG. 5, during first and second display frames 500 and 502 (each having a frame time 504), a pixel scan 506 indicates the sequential operation of the rows 308 of pixel array 200 over time, as indicated by arrow 302 of FIG. 3. FIG. 5 also shows emission times 508 and 510, respectively, for left portion 200L and right portion 200R for each display frame. For example, pixel rows 308 (see FIG. 3) may be operated in accordance with pixel scan 506 over a scan time 512 within frame time 504, and then backlit by zones 1 and 2 of a backlight for the display during emission times 508 and 510. Backlighting of zones such as zones 1 and 2 corresponding to left portion 200L and right portion 200R can be achieved using a two-dimensional array of backlight emitters and/or a shutter or switch outside or inside the display to control light emission.

Figure 6:
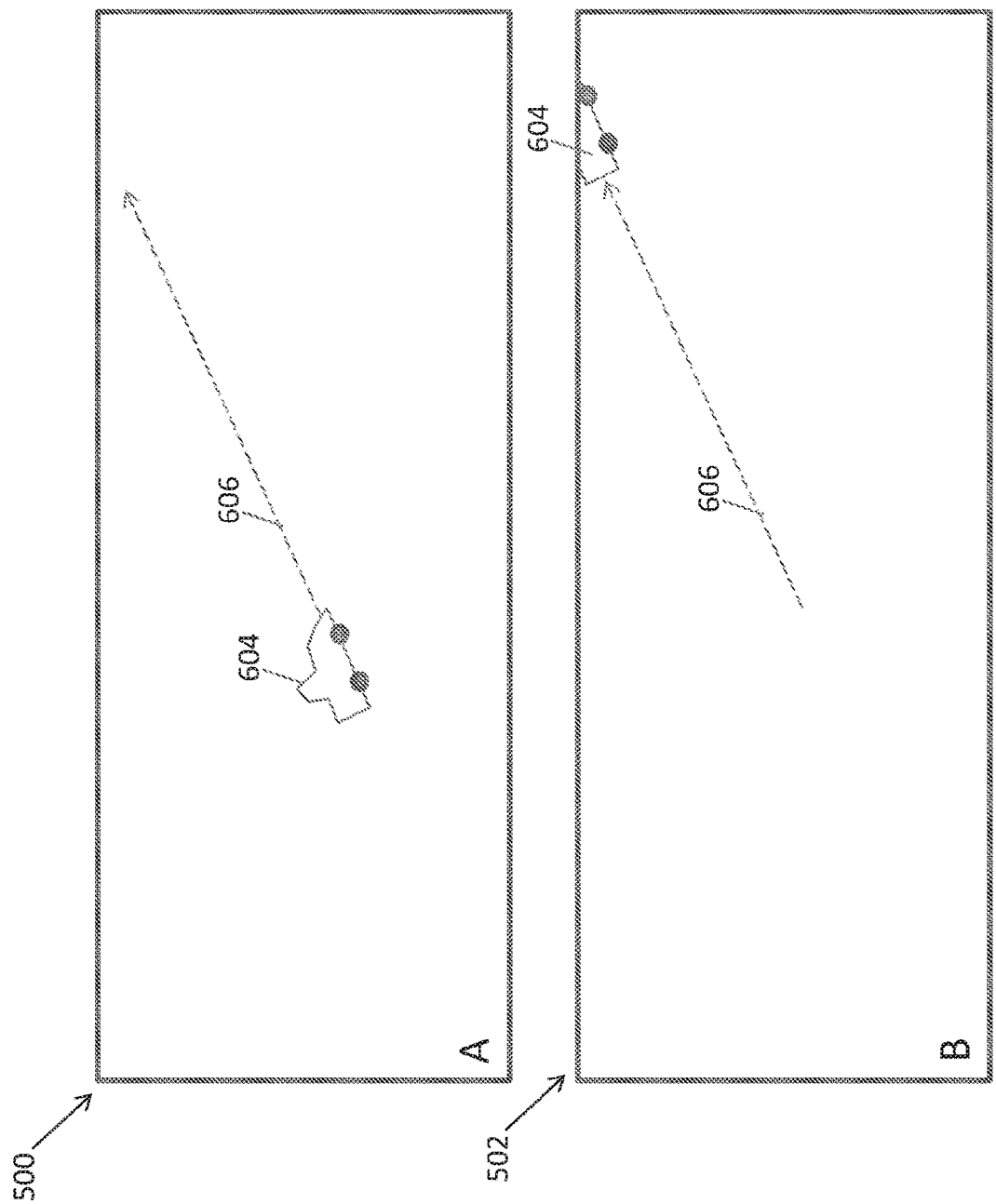
FIG. 6 illustrates first and second display frames that may be rendered and displayed in accordance with various aspects of the subject technology.

FIG. 6 shows an illustrative example of display frames 500 and 502, respectively including display content A and B, that may be displayed using pixel array 200. In the example of FIG. 6, display content A includes a car 604 at the center left of display frame 500. As indicated by arrow 606, car 604 is moving up and to the right in the display frame. Accordingly, in the subsequent display frame 502, content B includes car 604 in a new position at the top right of the frame. In this example, the relatively fast motion of car 604 relative to the frame rate at which frames 500 and 502 are displayed leaves a large gap between the displayed positions of car 604 that may be visually noticeable to a user.

In the example of FIGS. 5 and 6, each of display frames 500 and 502 is rendered using full screen display content (e.g., content A and content B, respectively). However, in various scenarios (e.g., for display of television content, AR content, or VR content), it may be desirable to increase the frame rate (e.g., decrease frame time 504). For example, it may be desirable to display more display frames in which car 604 is displayed at more positions along arrow 606. However, reducing frame time 504 uses additional power for more frequent pixel scans 506 and more frequent backlight emission times 508 and 510.

In accordance with aspects of the subject technology, a data rendering operation is provided with which the frame rate can be effectively increased, without substantial increase in power consumption by the device. In this way, a virtual frame rate booster can be provided.

Figure 7:
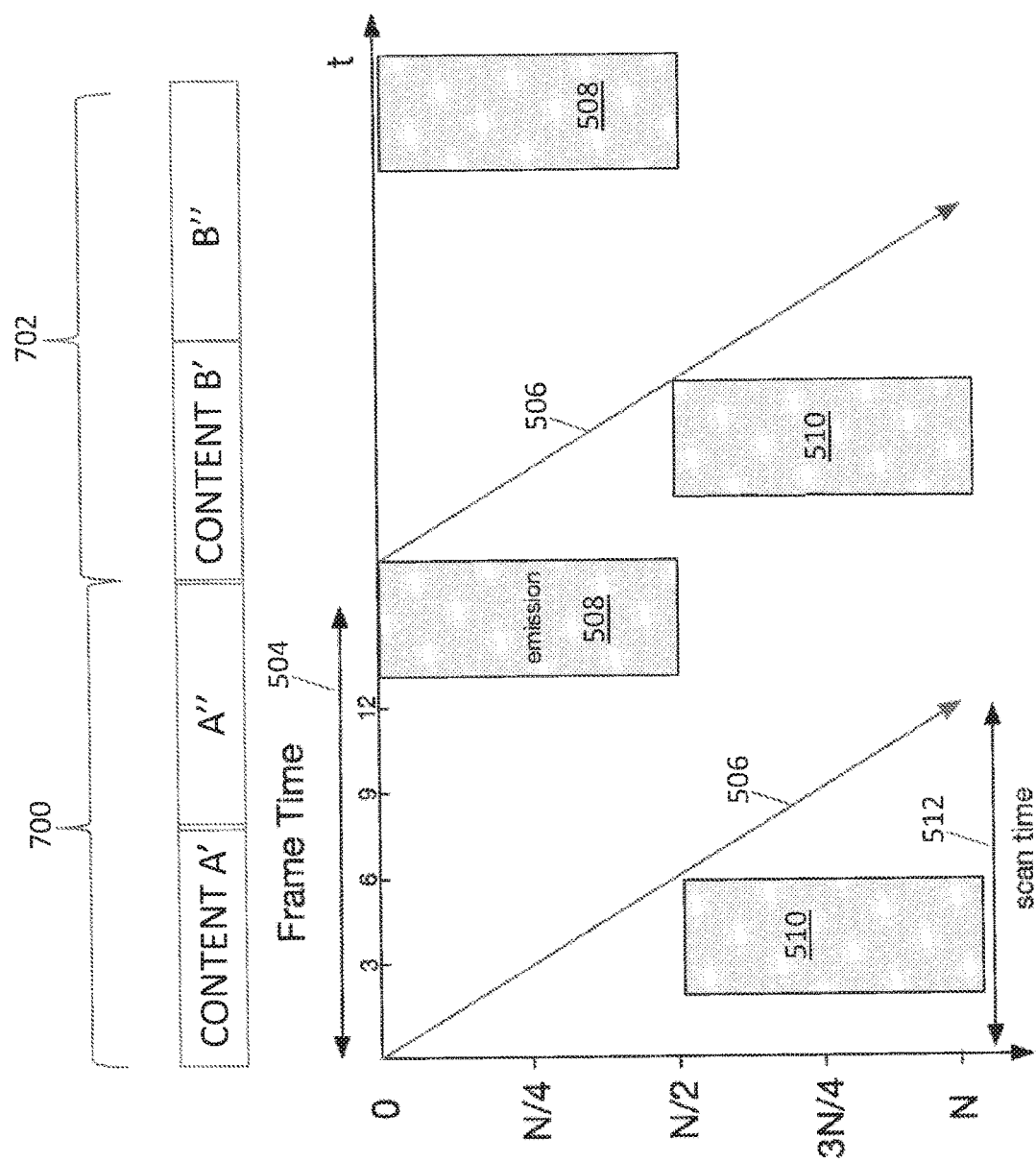
FIG. 7 illustrates a schematic diagram of timing aspects for operation of a display with partial frame rendering in accordance with various aspects of the subject technology.

For example, as shown in FIG. 7, during two adjacent display frames 700 and 702, having the same frame time 504 and scan time 512 as display frames 500 and 502 of FIGS. 5 and 6, content A', A", B' and B" is rendered for display (e.g., in four corresponding partial display frames).

In this example, content A' is rendered for a first partial display frame (e.g., a first portion such as a first half of display frame 700) to be displayed using a first portion (e.g., left portion 200L) of pixel array 200. The first partial display frame containing content A' is displayed using the first portion of the array with the first half of pixel scan 506 and the emission period 508 for display frame 700.

Content A" is then rendered for a second partial display frame (e.g., a second portion such as a second half of display frame 700) to be displayed using the second portion (e.g., right half 200R) of the array. The second partial display frame containing content A" is displayed using the second portion of the array with the second half of pixel scan 506 and the emission period 510 for display frame 700. In various examples, content A" can be rendered while content A' is being displayed, or content A' and content A" can be rendered to partial display frames before either is displayed (e.g., for VR applications for which real-world tracking and/or overlay of content is not needed and a frame delay can be implemented).

Figure 8:
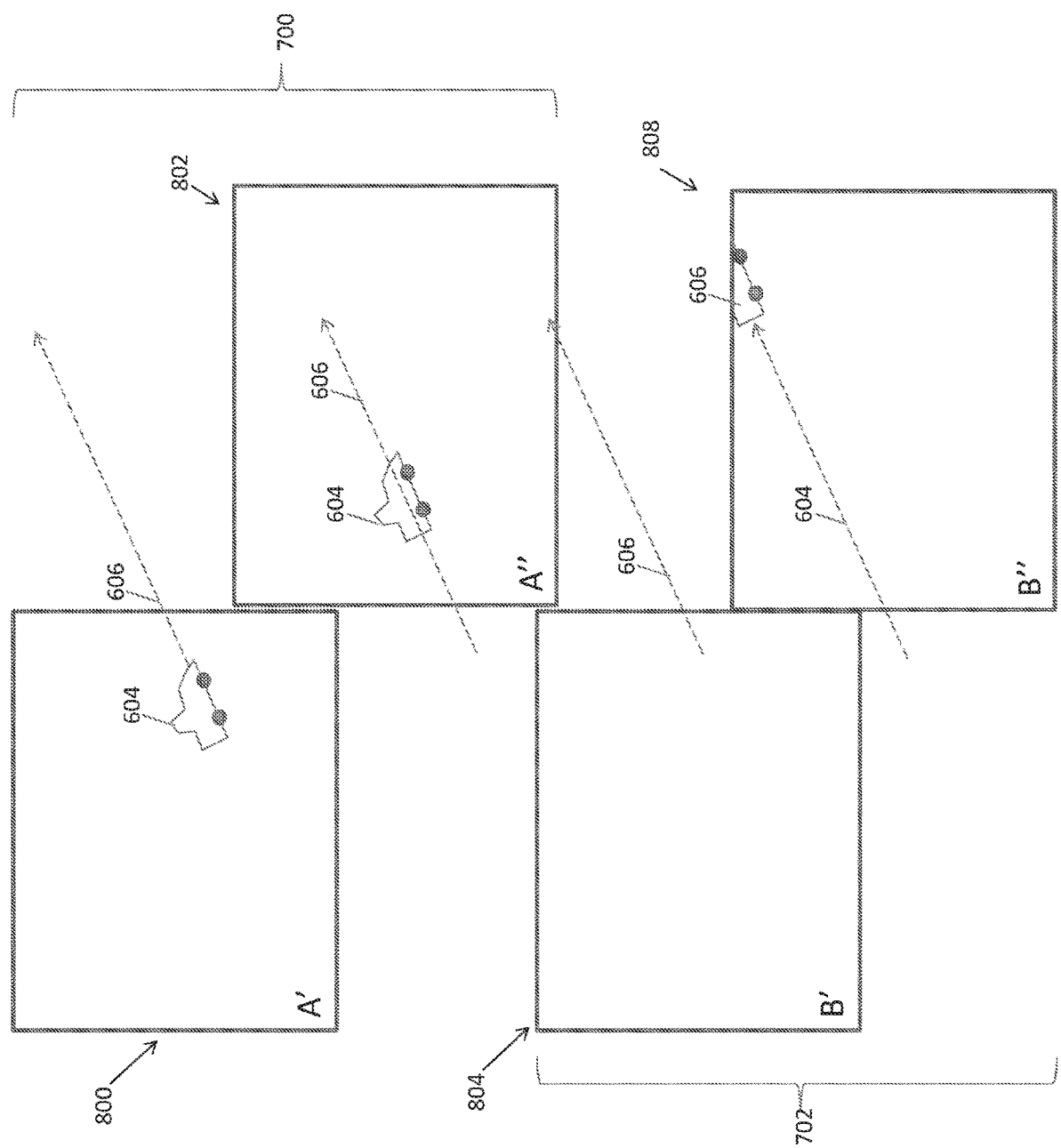
FIG. 8 illustrates partial display frames that may be rendered and displayed in accordance with various aspects of the subject technology.

FIG. 8 illustrates how the operations of FIG. 7 can provide a virtual frame rate boost for the content displayed in FIG. 6. More specifically, FIG. 8 shows how display frame 700 corresponds to two partial display frames 800 and 802 containing, respectively, content A' and content A". As shown, content A' includes the left half of content A of FIG. 6. However, content A" includes car 604 at an intermediate position along arrow 606 between the positions of display frames 500 and 502 of FIG. 6. Partial display frame 800 is displayed using left half 200L and partial display frame 800 is displayed using right half 200R of array 200.

Partial display frame 804 of display frame 702 is displayed using left half 200L and includes content B' in which car 604 is not included because the car has moved out of that portion of the frame. Partial display frame 808 of display frame 702 is displayed using right half 200R and includes content B" which is the same as the right half of display frame 502 of FIG. 6. In this way, it can be seen that the data rendering operations described herein provide a virtual frame rate booster. This virtual frame rate booster can be applied to any desirable display content, but may be particularly useful for AR and/or VR display content. The virtual frame rate booster can also help increase the content response time to sensor data inputs such as head movements in AR and/or VR applications. However, it should also be appreciated that the virtual frame rate booster can be applied to increase the effective frame rate even when the content is full-screen content.

Figure 9:
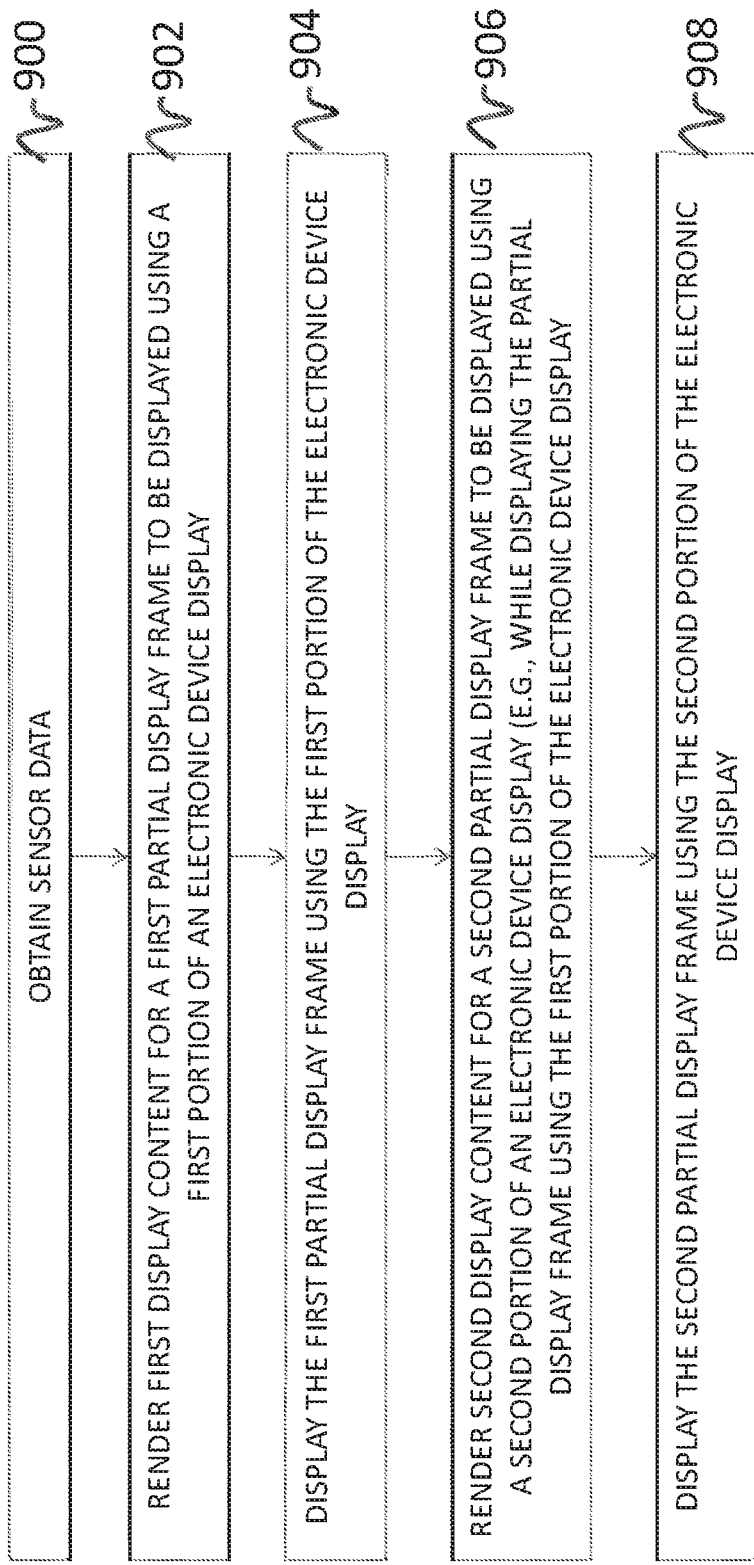
FIG. 9 illustrates a flow chart of an example process for operating an electronic device display in accordance with various aspects of the subject technology

FIG. 9 depicts a flow diagram of an example process for operating a display for an electronic device in accordance with various aspects of the subject technology. For explanatory purposes, the example process of FIG. 9 is described herein with reference to the components of FIGS. 1-3. For example, the display may include an array 200 of display pixels 206, the array including a first portion (e.g., a left portion 200L) and a second portion (e.g., a right portion 200R). Further for explanatory purposes, the blocks of the example process of FIG. 9 are described herein as occurring in series, or linearly. However, multiple blocks of the example process of FIG. 9 may occur in parallel. In addition, the blocks of the example process of FIG. 9 need not be performed in the order shown and/or one or more of the blocks of the example process of FIG. 9 need not be performed.

In the depicted example flow diagram, at block 900, sensor data may be obtained (e.g., by system circuitry 208 from one or more sensors such as sensor(s) 277). The sensor data may include head position data, head motion data, eye position data, eye motion data, real-world content data, and/or other suitable sensor data for AR and/or VR applications.

At block 902, display control circuitry such as GPU 212, timing controller 210, column drivers 202 and/or gate drivers 204 renders first display content (see, e.g., content A' or B' of FIGS. 7 and 8) for a first partial display frame (see, e.g., partial display frame 800 or 804) to be displayed using the first portion of the array. The first display content may be rendered based on, or independent of, the sensor data.

At block 904, the first partial display frame is displayed using the first portion of the array.

At block 906, the display control circuitry renders second display content (see, e.g., second display content A" or B" of FIGS. 7 and 8) for a second partial display frame (see, e.g., partial display frame 802 or 808) to be displayed using the second portion of the array. The second display content may be rendered based on, or independent of, the sensor data and/or additional sensor data. The second display content may be rendered before or while displaying the first partial display frame using the first portion of the array.

At block 908, the second partial display frame is displayed using the second portion of the array. The first display content may be left eye content and the second display content may be right eye content (e.g., of virtual reality content or augmented reality content). The operations of blocks 900, 902, 904, 906, and/or 908 may be repeated as desired when a virtual frame rate boost is desired (e.g., for a split-screen mode of operation for the display).

Whether or not a virtual frame rate boost is applied as described in connection with FIGS. 6-9, the pixel rows 308 (see FIG. 3) of array 200 may be operated sequentially as illustrated by arrow 302 of FIG. 3, or can be operated in a v-drive operation.

Figure 10:
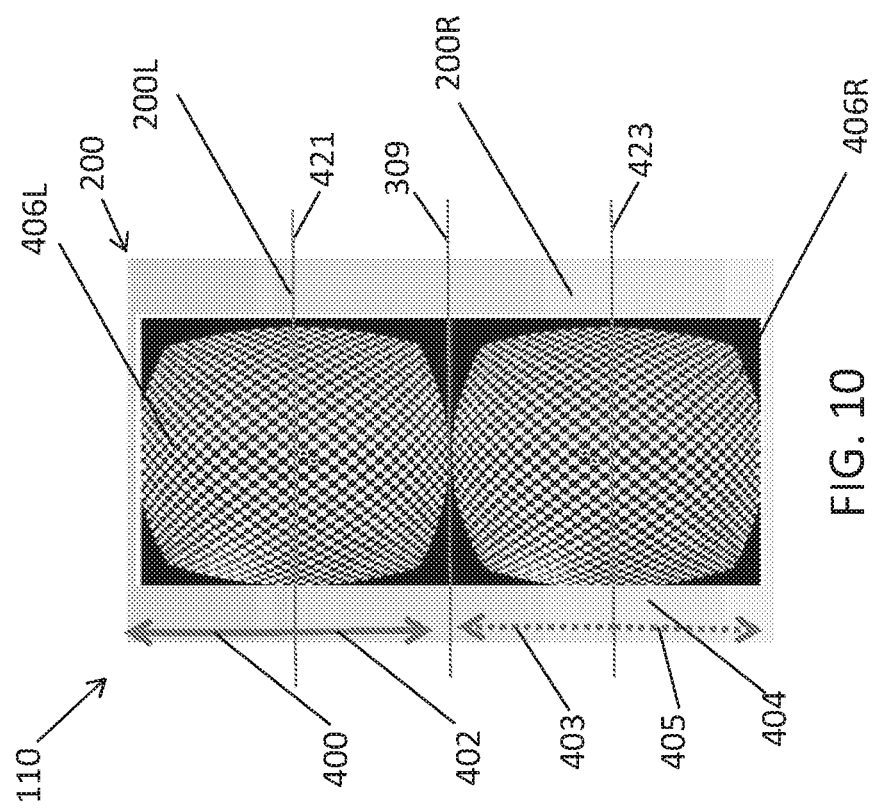
FIG. 10 illustrates a schematic diagram of a pixel array in a v-drive split-screen mode of operation in accordance with various aspects of the subject technology.

FIG. 10 illustrates a v-drive split-screen mode of operation for display 110. In particular, arrows 400 and 402 illustrate how, in the v-drive split-screen mode, pixels rows on first and second sides of a center 421 of a first half (e.g., left portion 200L) of array 200 are alternatingly operated to display a first portion of a display frame. Arrows 403 and 405 illustrate how, in the v-drive split-screen mode, pixels rows on first and second sides of a center 423 of the second half (e.g., right portion 200R) of the array are alternatingly operated to display a second portion of the display frame.

Figure 11:
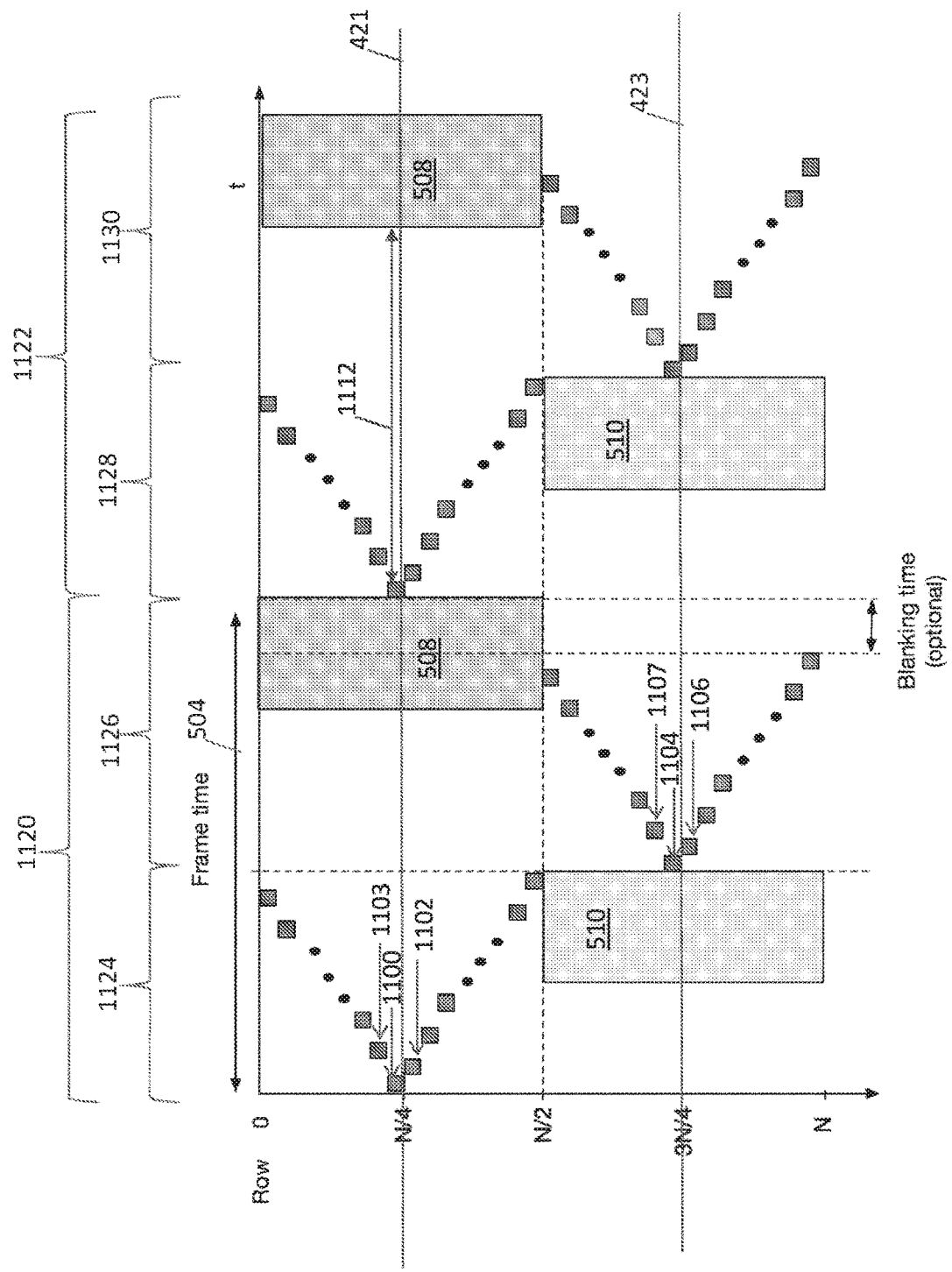
FIG. 11 illustrates a schematic diagram of timing aspects for row driving for a display in a v-drive split-screen mode of operation in accordance with various aspects of the subject technology.

FIG. 11 illustrates further details of the v-drive mode of operation. In particular, FIG. 11 shows how alternatingly operating the pixels rows on the first and second sides of the center 421 of the first half of the array to display a first portion 1124 (or 1128) of a display frame 1120 (or 1122) can include operating a centermost pixel row 1100 of the pixels rows on the first side of the center 421 of the first half of the array, operating, immediately after centermost pixel row 1100 of the pixels rows on the first side of the center 421 of the first half of the array, a centermost pixel row 1102 of the pixels rows on the second side of the center 421 of the first half of the array, operating, immediately after the centermost pixel row 1102 of the pixels rows on the second side of the center 421 of the first half of the array, a pixel row 1103 that is adjacent to the centermost pixel row 1100 of the pixels rows on the first side of the center 421 of the first half of the array. As shown in FIG. 11, this alternating operation of pixel rows on the first and second sides of center 421 can continue until all rows in the first half 200L have been operated to complete first portion 1124 of display frame 1120.

FIG. 11 also shows how alternatingly operating the pixels rows on the first and second sides of the center 423 of the second half of the array of display pixels to display the second portion 1126 (or 1130) of the display frame 1120 (or 1122) can include operating a centermost pixel row 1104 of the pixels rows on the first side of the center 423 of the second half of the array, operating, immediately after centermost pixel row 1104 of the pixels rows on the first side of the center 423 of the second half of the array, a centermost pixel row 1106 of the pixels rows on the second side of the center 423 of the second half of the array, and operating, immediately after the centermost pixel row 1106 of the pixels rows on the second side of the center 423 of the second half of the array, a pixel row 1107 that is adjacent to the centermost pixel row 1104 of the pixels rows on the first side of the center 423 of the second half of the array. As shown in FIG. 11, this alternating operation of pixel rows on the first and second sides of center 423 can continue until all rows in the second half 200R have been operated to complete second portion 1126 of display frame 1120.

First and second portions 1124 and 1126 may correspond to partial display frames 800 and 802 of FIG. 8 in one example. First and second portions 1128 and 1130 may correspond to partial display frames 804 and 808 of FIG. 8 in one example.

It can be seen in FIG. 11 that the time 1112 between writing data to the pixel rows in each half of the array and the emission times 508 and 510 is longest at the centers 421 and 423 of each half in the v-drive operation. This can allow longer liquid crystal response times at the center of each half, which can provide enhanced image quality in these central regions. Because the user's eyes will typically be directed toward the center of each corresponding region, better optical performance can be achieved, particularly for split-screen viewing such as for AR and/or VR content.

Figure 12:
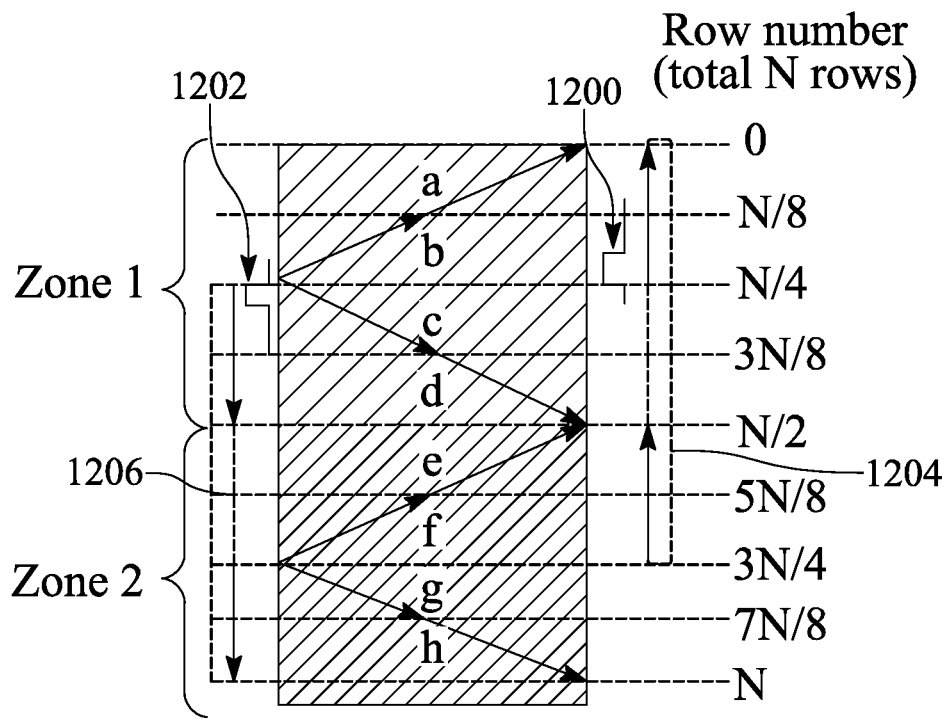
FIG. 12 illustrates a schematic diagram showing phase clock timing for a v-drive split-screen mode of operation in accordance with various aspects of the subject technology.

As shown in FIG. 12, the v-drive operation of FIGS. 10 and 11 can be achieved using two phase clocks, one on each side of array 200. For example, in each of zones 1 and 2, gate-in-panel drivers on opposing sides of the array can alternately turn on rows for each data scan. As shown in FIG. 12, two start pulses 1200 and 1202 may roll (as indicated by arrows 1204 and 1206) for data writing.

In the examples described herein, emission from display 110 is controlled by zoned operation of the display backlight with two zones corresponding to left and right portions 200L and 200R of pixel array 200. However, it should also be appreciated that the same v-drive operation for pixel rows 308 can be provided with different backlight zones.

Figure 13:
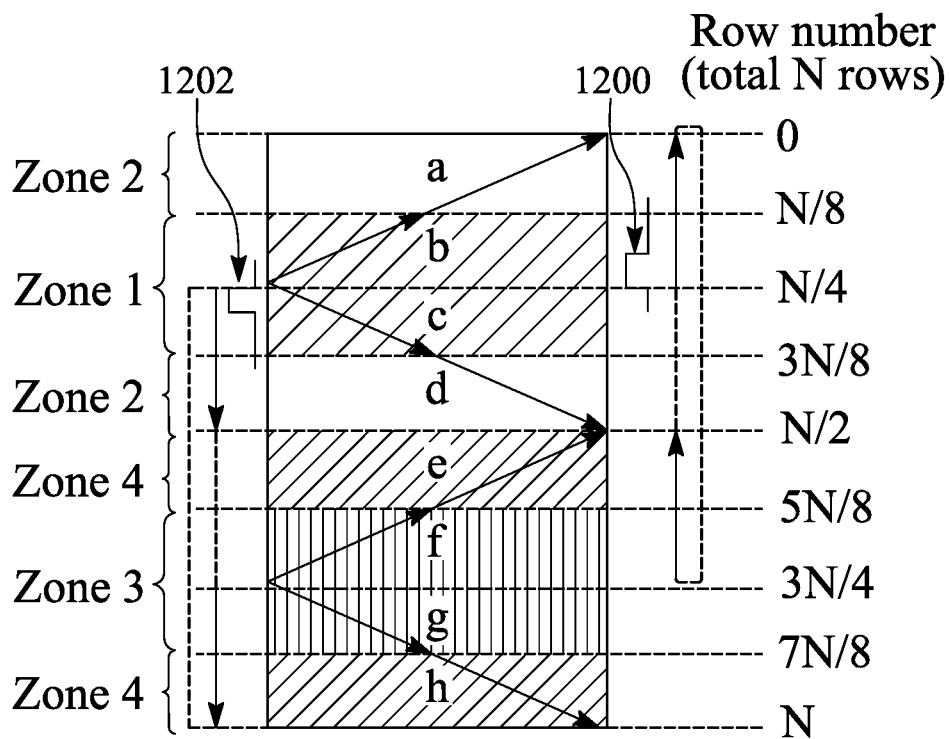
FIG. 13 illustrates a schematic diagram showing zone-based backlight operations for a v-drive split-screen mode of operation in accordance with various aspects of the subject technology.
Figure 14:
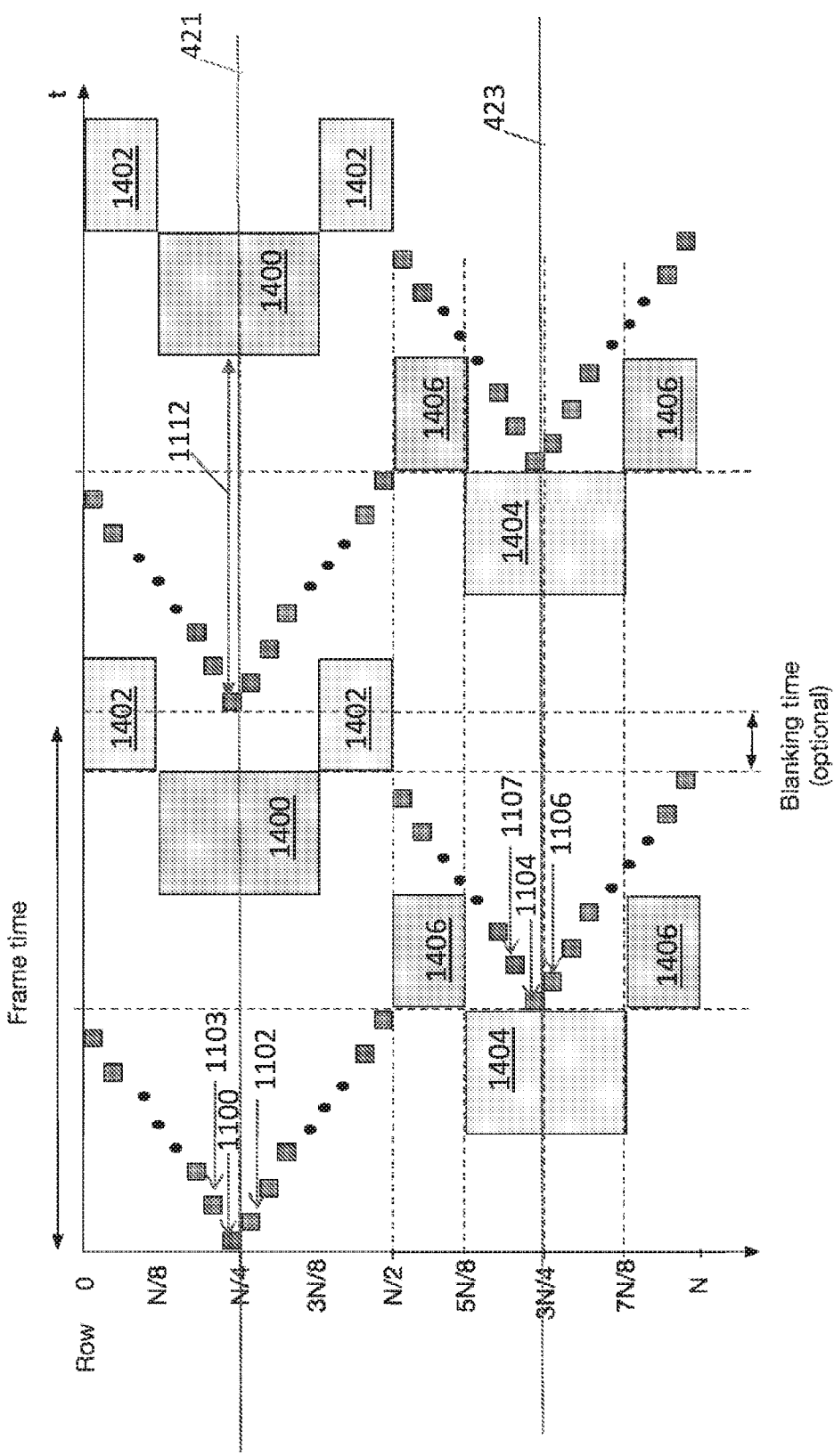
FIG. 14 illustrates a schematic diagram of timing aspects of zone-based backlight operations within each half of a display for a v-drive split-screen mode of operation in accordance with various aspects of the subject technology.

For example, FIGS. 13 and 14 illustrate an example in which pixel rows in groups a, b, c, d, e, f, g, and h of the pixel array are operated as described in connection with FIGS. 10-12, but the backlight is operated in four zones 1, 2, 3, and 4. In this example, pixel row groups b and c (at the center of left half 200L) are illuminated by zone 1 during an emission period 1400 of each frame, pixel row groups a and d are illuminated by zone 2 during an emission period 1402 of each frame, pixel row groups f and g (at the center of right half 200R) are illuminated by zone 3 during an emission period 1404 of each frame, and pixel row groups e and h are illuminated by zone 4 during an emission period 1406 of each frame.

FIG. 14 also shows how illuminating the pixels in this way (e.g., illuminating multiple zones of each of the first and second halves of the array), provides an increased time (e.g., for liquid crystal settling) between writing data to the pixel rows groups a, d, e, and h, for further enhanced image quality in these regions.

Figure 15:
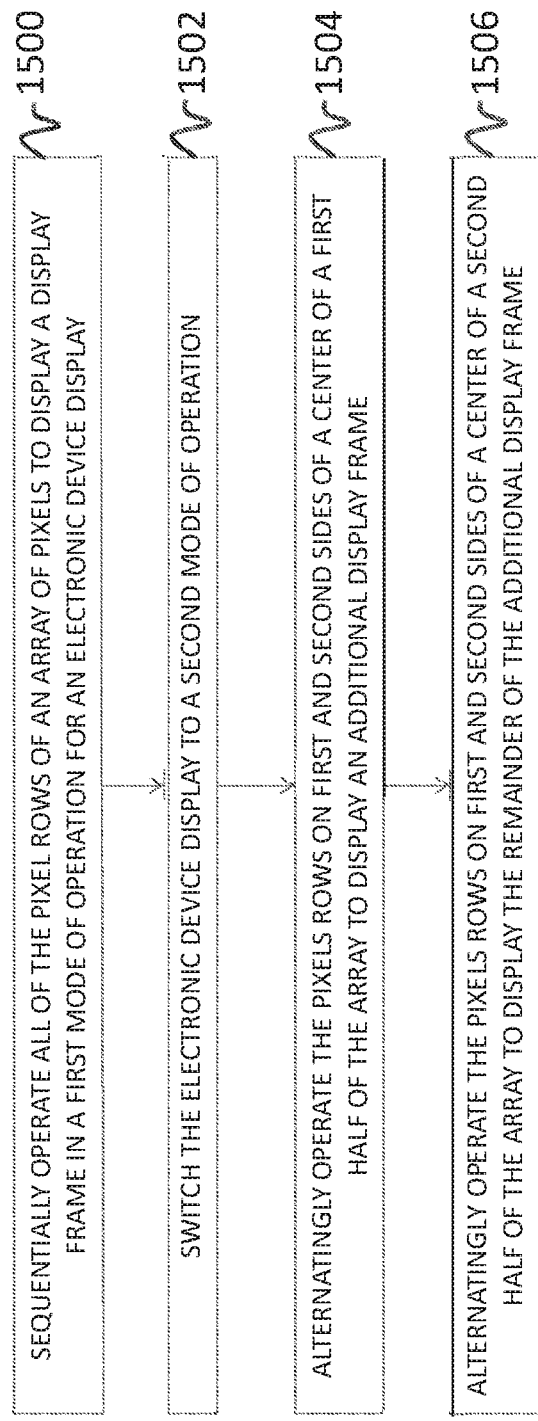
FIG. 15 illustrates a flow chart of an example process for operating an electronic device display in accordance with various aspects of the subject technology.

FIG. 15 depicts a flow diagram of an example process for a v-drive operation of a display for an electronic device in accordance with various aspects of the subject technology. For explanatory purposes, the example process of FIG. 15 is described herein with reference to the components of FIGS. 1-3. For example, the display may include an array 200 of display pixels 206, the array including a first half (e.g., 200L) on a first side of a center 309 of the array, and a second half (e.g., 200R) on a second side of the center 309 of the array. Further for explanatory purposes, the blocks of the example process of FIG. 15 are described herein as occurring in series, or linearly. However, multiple blocks of the example process of FIG. 15 may occur in parallel. In addition, the blocks of the example process of FIG. 15 need not be performed in the order shown and/or one or more of the blocks of the example process of FIG. 15 need not be performed.

In the depicted example flow diagram, at block 1500, all of the pixel rows 308 of the array 200 are sequentially operated (see, e.g., FIG. 3) to display a full-screen display frame (e.g., in a first mode of operation for the display such as a full-screen mode of operation).

At block 1502, system circuitry 208 or display control circuitry may switch the display to a second mode of operation such as a split-screen mode of operation (e.g., a VR mode of operation of an AR mode of operation). The display may be switched to the second mode of operation responsive to user input or responsive to a detection of split-screen content (e.g., from a VR application or an AR application generating split-screen content).

At block 1504, display control circuitry such as display control circuitry 214 may alternatingly operate pixels rows (e.g., 1100, 1102, 1103, etc.) on first and second sides of a center 421 of the first half of the array of display pixels to display a first portion (e.g., 1124 or 1128) of a display frame (e.g., 1120 or 1122). The display frame may correspond to a virtual-reality mode of operation or an augmented-reality mode of operation for the display.

Alternatingly operating the pixels rows on the first and second sides of the center of the first half of the array of display pixels to display the first portion of the display frame may include operating a centermost pixel row of the pixels rows on the first side of the center of the first half of the array, operating, immediately after the centermost pixel row of the pixels rows on the first side of the center of the first half of the array, a centermost pixel row of the pixels rows on the second side of the center of the first half of the array, and operating, immediately after the centermost pixel row of the pixels rows on the second side of the center of the first half of the array, a pixel row that is adjacent to the centermost pixel row of the pixels rows on the first side of the center of the first half of the array At block 1506, the display control circuitry may alternatingly operate pixels rows (e.g., 1104, 1106, 1107, etc.) on first and second sides of a center 423 of the second half of the array of display pixels to display a second portion (e.g., 1126 or 1130) of the display frame (e.g., 1120 or 1122). Alternatingly operating the pixels rows on the first and second sides of the center of the second half of the array of display pixels to display the second portion of the display frame may include operating a centermost pixel row of the pixels rows on the first side of the center of the second half of the array, operating, immediately after the centermost pixel row of the pixels rows on the first side of the center of the second half of the array, a centermost pixel row of the pixels rows on the second side of the center of the second half of the array, and operating, immediately after the centermost pixel row of the pixels rows on the second side of the center of the second half of the array, a pixel row that is adjacent to the centermost pixel row of the pixels rows on the first side of the center of the second half of the array.

In another embodiment, data rendering for a frame rate booster can provide an increase in frame rate while reducing a display effective resolution.

FIG. 16 illustrates a display having pixel row numbers and associated data for a frame rate booster in accordance with another embodiment. The display 1600 includes a sequence of row numbers 1, 2, . . . N−1, N and associated image data 1, 2, . . . N−1, N to be displayed on pixels of this display having an effective display resolution of N (ER=N).

FIG. 17 illustrates a display having a first configuration with pixel row numbers and associated first subset of data (e.g., odd data) for a frame rate booster in accordance with another embodiment. The display 1700 includes a sequence of row numbers 1, 3, . . . N−1, N and associated first subset of data (e.g., odd image data 1, 3, . . . N−1) to be displayed on pixels of this display having an effective display resolution of N/2 (ER=N/2). This first configuration uses the first subset of data (e.g., odd row image data only) and shares this first subset of row image data with an adjacent row.

FIG. 18 illustrates a display having a second configuration with pixel row numbers and associated second subset of data (e.g., even data) for a frame rate booster in accordance with another embodiment. The display 1800 includes a sequence of row numbers 2, 4, . . . N and associated second subset of data (e.g., even image data 2, 4, . . . N) to be displayed on pixels of this display having an effective display resolution of N/2 (ER=N/2). This second configuration uses the second subset of data (e.g., even row image data only) and shares this second subset of row image data with an adjacent row.

FIG. 19 illustrates multiple processing resources coupled to a display 1920 for a frame rate booster in accordance with another embodiment. The processing resources (e.g., GPU, CPU, FPGA, etc.) provide data rendering for the display 1920. In one example, the processing resource 1902 provides data rendering for the first configuration (e.g., first subset of data) and the processing resource 1904 provides data rendering for the second configuration (e.g., first subset of data) at the same time or nearly the same time as the data rendering for the first configuration. Thus, the processing resources 1902 and 1904 provide separate control of the data rendering for the display 1920. If each processing resource has a rendering rates of 60 Hertz (Hz), then the display has an effective frame rate of 120 Hz.

Figure 20:
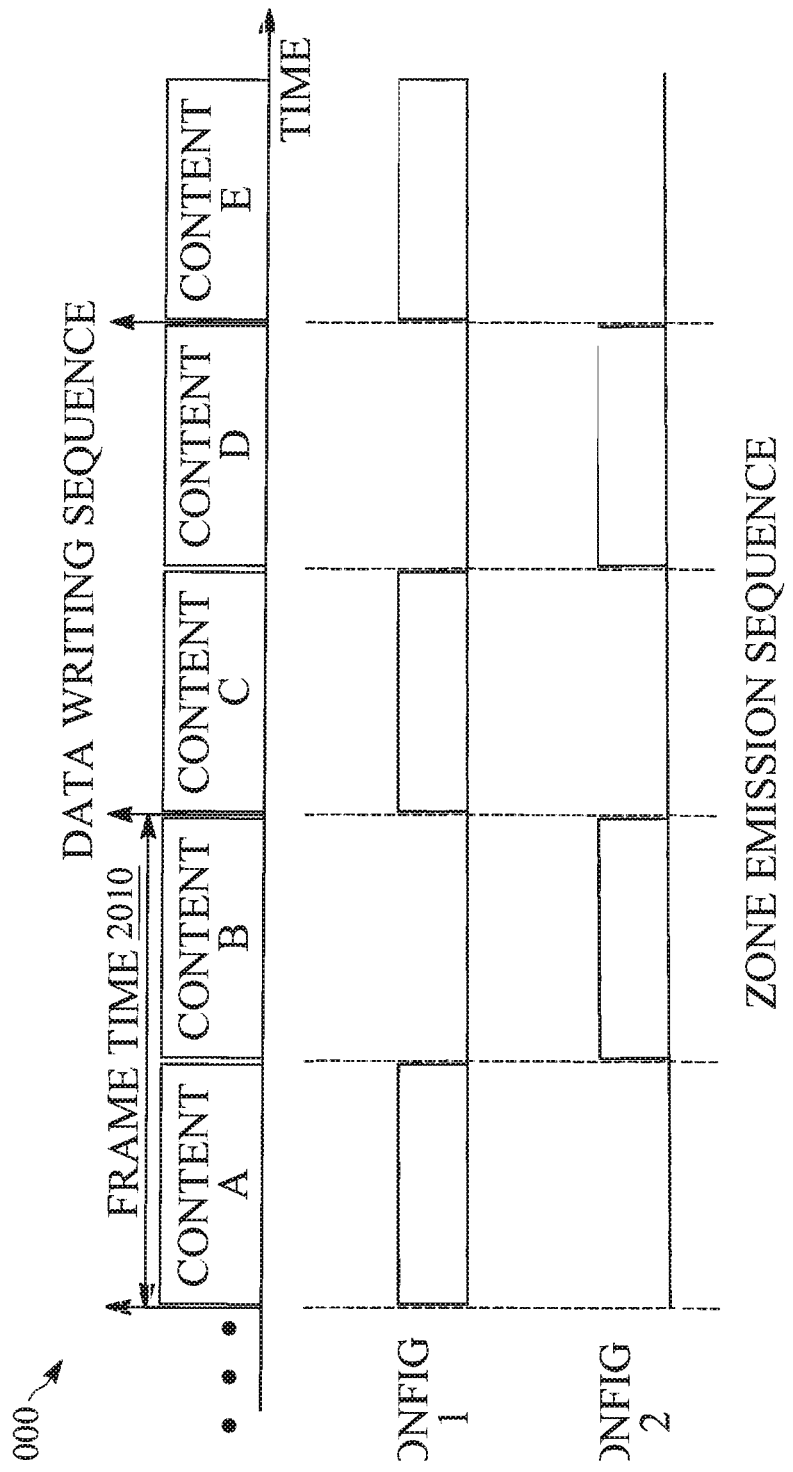
FIG. 20 illustrates a timing diagram for a data writing sequence 2000 in accordance with another embodiment.

FIG. 20 illustrates a timing diagram for a data writing sequence in accordance with another embodiment. Content A and B are rendered and then displayed on a display during a first frame time 2010 for a first frame. Content A can be displayed during a first time period and content B can be display during a second time period of the first frame time. Content C and D are rendered and then displayed on a display during a second frame time for a second frame. Content C can be displayed during a first time period and content B can be display during a second time period of a second frame time. Content E is rendered and then displayed on a display during a third frame time for a third frame.

In one example, content A corresponds to the first subset of data and content B corresponds to the second subset of data to be displayed during a first frame on the display. In one example for the processing resources 1902 and 1904, the frame rate is boosted by 2× with a trade-off of display resolution of ½. In another example for 3 processing resources, the frame rate is boosted by 3× with a trade-off of display resolution of ⅓. This design can be generalized for a frame boost rate of Nx with a trade-off of display resolution of 1/N.

In accordance with various aspects of the subject disclosure, an electronic device with a display is provided, the display including an array of display pixels including a first half on a first side of a center of the array, and a second half on a second side of the center of the array. The display also includes display control circuitry configured to alternatingly operate pixels rows on first and second sides of a center of the first half of the array of display pixels to display a first portion of a display frame, and alternatingly operate pixels rows on first and second sides of a center of the second half of the array of display pixels to display a second portion of the display frame.

In accordance with other aspects of the subject disclosure, a method of operating a display for an electronic device is provided, the display including an array of display pixels, the array including a first half on a first side of a center of the array, and a second half on a second side of the center of the array. The method includes alternatingly operating pixels rows on first and second sides of a center of the first half of the array of display pixels to display a first portion of a display frame, and alternatingly operating pixels rows on first and second sides of a center of the second half of the array of display pixels to display a second portion of the display frame.

In accordance with other aspects of the subject disclosure, an electronic device having a display is provided, the display including an array of display pixels having a first portion and a second portion, and display control circuitry. The display control circuitry is configured to render first display content for a first partial display frame to be displayed using the first portion of the array, display the first partial display frame using the first portion of the array, render second display content for a second partial display frame to be displayed using the second portion of the array, display the second partial display frame using the second portion of the array.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device with a display, the display comprising:
   an array of display pixels including:
      a first half on a first side of a center of the array, and
      a second half on a second side of the center of the array;
      and display control circuitry configured to:
         alternatingly operate pixels rows on first and second sides of a center of the first half of the array of display pixels to display a first portion of a display frame in a split-screen mode of operation; and
         alternatingly operate pixels rows on first and second sides of a center of the second half of the array of display pixels to display a second portion of the display frame in the split-screen mode of operation.

2. The electronic device of claim 1, wherein the display control circuitry is further configured to sequentially operate all of the pixels rows of the array to display another display frame.

3. The electronic device of claim 2, wherein the display frame corresponds to a virtual-reality mode of operation or an augmented-reality mode of operation for the display.

4. The electronic device of claim 3, wherein the other display frame corresponds to a full-screen mode of operation for the display.

5. The electronic device of claim 1, wherein the display control circuitry is configured to alternatingly operate the pixels rows on the first and second sides of the center of the first half of the array of display pixels to display the first portion of the display frame by:
   operating a centermost pixel row of the pixels rows on the first side of the center of the first half of the array;
   operating, immediately after the centermost pixel row of the pixels rows on the first side of the center of the first half of the array, a centermost pixel row of the pixels rows on the second side of the center of the first half of the array; and
   operating, immediately after the centermost pixel row of the pixels rows on the second side of the center of the first half of the array, a pixel row that is adjacent to the centermost pixel row of the pixels rows on the first side of the center of the first half of the array.

6. The electronic device of claim 5, wherein the display control circuitry is configured to alternatingly operate the pixels rows on the first and second sides of the center of the second half of the array of display pixels to display the second portion of the display frame by:
   operating a centermost pixel row of the pixels rows on the first side of the center of the second half of the array;
   operating, immediately after the centermost pixel row of the pixels rows on the first side of the center of the second half of the array, a centermost pixel row of the pixels rows on the second side of the center of the second half of the array; and
   operating, immediately after the centermost pixel row of the pixels rows on the second side of the center of the second half of the array, a pixel row that is adjacent to the centermost pixel row of the pixels rows on the first side of the center of the second half of the array.

7. The electronic device of claim 1, wherein the display control circuitry is further configured to:
   illuminate the first half of the array after alternatingly operating the pixels rows on the first and second sides of the center of the first half of the array of display pixels; and
   illuminate the second half of the array after alternatingly operating the pixels rows on the first and second sides of the center of the second half of the array of display pixels.

8. A method of operating a display for an electronic device, the display comprising an array of display pixels, the array including a first half on a first side of a center of the array, and a second half on a second side of the center of the array, the method comprising:
   alternatingly operating pixels rows on first and second sides of a center of the first half of the array of display pixels to display a first portion of a display frame in a split-screen mode of operation; and
   alternatingly operating pixels rows on first and second sides of a center of the second half of the array of display pixels to display a second portion of the display frame in the split-screen mode of operation.

9. The method of claim 8, further comprising sequentially operating all of the pixels rows of the array to display another display frame.

10. The method of claim 9, wherein the display frame corresponds to a virtual-reality mode of operation or an augmented-reality mode of operation for the display.

11. The method of claim 10, wherein the other display frame corresponds to a full-screen mode of operation for the display.

12. The method of claim 8, wherein alternatingly operating the pixels rows on the first and second sides of the center of the first half of the array of display pixels to display the first portion of the display frame comprises:
   operating a centermost pixel row of the pixels rows on the first side of the center of the first half of the array;
   operating, immediately after the centermost pixel row of the pixels rows on the first side of the center of the first half of the array, a centermost pixel row of the pixels rows on the second side of the center of the first half of the array; and
   operating, immediately after the centermost pixel row of the pixels rows on the second side of the center of the first half of the array, a pixel row that is adjacent to the centermost pixel row of the pixels rows on the first side of the center of the first half of the array.

13. The method of claim 12, wherein alternatingly operating the pixels rows on the first and second sides of the center of the second half of the array of display pixels to display the second portion of the display frame comprises:
   operating a centermost pixel row of the pixels rows on the first side of the center of the second half of the array;
   operating, immediately after the centermost pixel row of the pixels rows on the first side of the center of the second half of the array, a centermost pixel row of the pixels rows on the second side of the center of the second half of the array; and
   operating, immediately after the centermost pixel row of the pixels rows on the second side of the center of the second half of the array, a pixel row that is adjacent to the centermost pixel row of the pixels rows on the first side of the center of the second half of the array.

14. The method of claim 8, further comprising:
   illuminating the first half of the array after alternatingly operating the pixels rows on the first and second sides of the center of the first half of the array; and illuminating the second half of the array after alternatingly operating the pixels rows on the first and second sides of the center of the second half of the array.

15. The method of claim 14, wherein illuminating the first half of the array comprises concurrently illuminating the entire first half of the array, and wherein illuminating the second half of the array comprises concurrently illuminating the entire second half of the array.

16. The method of claim 14, wherein illuminating the first half of the array comprises separately illuminating multiple zones of the first half of the array, and wherein illuminating the second half of the array comprises separately illuminating multiple zones of the second half of the array.

17. An electronic device having a display, the display comprising:
an array of display pixels having a first portion and a second portion; and
display control circuitry having multiple processing resources to provide a frame rate booster is configured to:
data render, with a first processing resource, first display content for a first partial display frame to be displayed using the first portion of the array;
display the first partial display frame using the first portion of the array;
data render, with a second processing resource, second display content for a second partial display frame to be displayed using the second portion of the array; and
display the second partial display frame using the second portion of the array, wherein the first and second processing resources provide separate control of the data rendering for the display.

18. The electronic device of claim 17, wherein the display control circuitry is configured to render the second display content while displaying the first partial display frame using the first portion of the array.

19. The electronic device of claim 17, wherein the first display content comprises left eye content and wherein the second display content comprises right eye content.

20. The electronic device of claim 19, wherein the left eye content and the right eye content comprise virtual reality content or augmented reality content.

21. An electronic device having a display, the display comprising:
an array of display pixels; and
display control circuitry having multiple processing resources to provide a frame rate booster is configured to:
data render, with a first processing resource, a first configuration having a first subset of data for a first frame to be displayed using the array of display pixels;
data render, with a second processing resource, a second configuration having a second subset of data for the first frame to be displayed using the array of display pixels;
display the first subset of data during a first time period for the first frame using the array of display pixels; and
display the second subset of data during a second time period for the first frame using the array of display pixels, wherein the first and second processing resources provide separate control of the data rendering for the display.

22. The electronic device of claim 21, wherein the first processing resource is configured to render the first subset of data at the same time as the second processing resource is configured to render the second subset of data.

23. The electronic device of claim 21, wherein the first configuration uses the first subset of data comprising odd row image data and shares this odd row image data with an adjacent row.

24. The electronic device of claim 21, wherein the second configuration uses the second subset of data comprising even row image data and shares this even row image data with an adjacent row.

* * * * *

UNITED STATES PATENT AND TRADEMARK OFFICE
CERTIFICATE OF CORRECTION

| | |
|---|---|
| PATENT NO. | : 11,081,069 B2 |
| APPLICATION NO. | : 16/509406 |
| DATED | : August 3, 2021 |
| INVENTOR(S) | : Jun Li et al. |

It is certified that error appears in the above-identified patent and that said Letters Patent is hereby corrected as shown below:

On the Title Page

Item (73) Assignee: "Appe Inc." should be changed to --Apple Inc.--

Signed and Sealed this
Seventh Day of March, 2023

Katherine Kelly Vidal
*Director of the United States Patent and Trademark Office*